United States Patent [19]

Cull et al.

[11] 4,255,288

[45] Mar. 10, 1981

[54] ZIRCONIA-CONTAINING CATALYSTS

[75] Inventors: Neville L. Cull, Baker; Willard H. Sawyer, Baton Rouge, both of La.

[73] Assignee: Exxon Research & Engineering Co., Florham Park, N.J.

[21] Appl. No.: 65,768

[22] Filed: Aug. 13, 1979

[51] Int. Cl.$^3$ .............................................. B01J 29/10
[52] U.S. Cl. ................................................. 252/455 Z
[58] Field of Search ................................... 252/455 Z

[56] References Cited

U.S. PATENT DOCUMENTS

| | | |
|---|---|---|
| Re. 29,771 | 9/1978 | Cull et al. ...................... 252/455 R |
| 3,694,378 | 9/1972 | Ebregi ............................... 252/455 Z |
| 3,781,199 | 12/1973 | Ward .................................. 252/455 Z |
| 3,840,473 | 10/1974 | Bewther et al. ...................... 252/439 |
| 3,928,233 | 12/1975 | Young ............................... 252/455 Z |
| 4,120,825 | 10/1978 | Ward .................................. 252/455 Z |
| 4,151,119 | 4/1979 | Gladrow ........................... 252/455 Z |

*Primary Examiner*—Carl F. Dees
*Attorney, Agent, or Firm*—Marthe L. Gibbons

[57] ABSTRACT

A catalyst comprising an ultrastable Y-type crystalline aluminosilicate zeolite, alumina, zirconia and a hydrogenation component is prepared by specified methods. The catalysts are suitable as hydrocarbon hydroprocessing catalysts.

14 Claims, 1 Drawing Figure

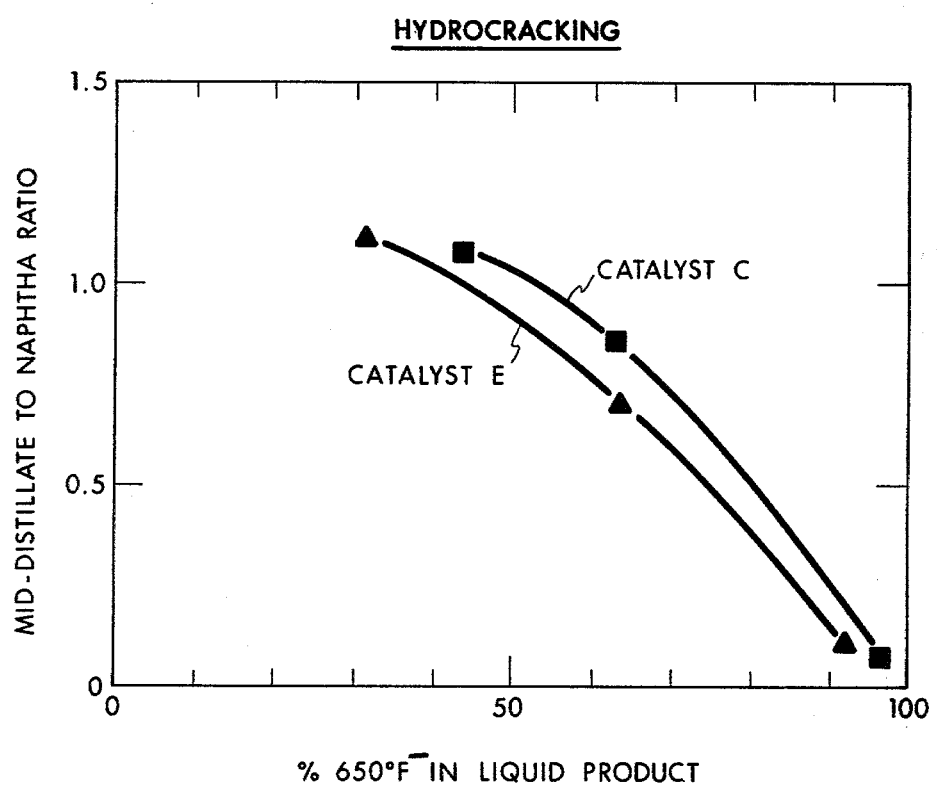

ZIRCONIA-CONTAINING CATALYSTS

BACKGROUND OF THE INVENTION

1. Field of the Invention

This invention relates to a catalyst characterized by its method of preparation. More particularly, this invention relates to catalysts suitable for hydroprocessing hydrocarbonaceous oils.

2. Description of the Prior Art

Hydroprocessing utilizing catalysts in the presence of hydrogen to refine or convert hydrocarbons is well known. The term "hydroprocessing" is used herein to denote a process in which a hydrocarbonaceous chargestock is contacted with a catalyst in the presence of hydrogen and under selected conditions to remove heteroatoms, such as sulfur, nitrogen, oxygen and metallic contaminants such as nickel, vanadium, and iron from the chargestock and/or to saturate hydrocarbons and/or olefinic hydrocarbons in the feedstock and/or to hydrocrack the chargestock. Suitable hydroprocessing processes include hydroconversion, hydrocracking, hydrodesulfurization, hydrodenitrogenation, hydrodemetallization, etc.

A hydrocracking catalyst is known which comprises a crystalline aluminosilicate zeolite, a refractory oxide which may be a mixture of alumina and zirconia and a hydrogenation component of Group VIB and VIII of a Periodic Table of Elements. The zeolite may be an ultrastable Y-type zeolite (see column 3, lines 31 to 32 and column 6, lines 2 to 3 of U.S. Pat. No. 4,120,825).

It is known to prepare a zirconia-coated alumina and thereafter to impregnate the coated alumina with a solution of the desired active metal to produce catalysts or sorbents. See U.S. Pat. No. Re 29,771.

A hydrosulfurization catalyst is also known which comprises a non-zeolitic refractory oxide carrier, Group VI and Group VIII hydrogenation components and a Group IVB metal oxide which may be zirconia. See U.S. Pat. No. 3,840,473.

It has now been found that a catalyst prepared by a specified method has advantages that will become apparent in the ensuing description.

SUMMARY OF THE INVENTION

In accordance with the invention there is provided, a catalyst prepared by the steps which comprise:

(a) mixing an ultrastable Y-type crystalline aluminosilicate zeolite and an alumina-containing material;

(b) treating the product resulting from step (a) with a zirconium compound convertible to zirconium oxide by calcination;

(c) calcining the product resulting from step (b) thereby converting said zirconium compound to zirconium oxide;

(d) compositing the product resulting from step (c) with a hydrogenation component selected from the group consisting of Group VIB components and Group VIII components and mixtures thereof, and (e) recovering a catalyst comprising an ultrastable Y-type zeolite, alumina, zirconium oxide and a hydrogenation component selected from the group consisting of an elemental metal, a metal oxide and a metal sulfide of Group VIB metals and an elemental metal, metal oxide and metal sulfide of Group VIII metals and mixtures thereof.

BRIEF DESCRIPTION OF THE DRAWING

The FIGURE is a graph showing selectivity to conversion relationship of the product resulting from use of a catalyst prepared according to embodiment A.

DETAILED DESCRIPTION OF THE INVENTION

The starting materials for the preparation of the catalyst of the present invention include an ultrastable Y-type crystalline aluminosilicate zeolite, an alumina-containing material, a zirconium compound and a hydrogenation component. The final catalyst may comprise from about 5 to about 35 weight percent hydrogenation component, calculated as the metal oxide, based on the total catalyst, from about 10 to about 50 weight percent ultrastable Y-type crystalline aluminosilicate zeolite, from about 75 to about 25 weight percent alumina-containing material, and from about 2 to about 10 weight percent zirconia.

THE ULTRASTABLE Y-TYPE ZEOLITE

Ultrastable Y-type zeolites are well known. They are described, for example, in U.S. Pat. No. 3,293,192 and U.S. Pat. No. 3,402,996 and in the publication, Society of Chemical Engineering (London) Monograph Molecular Sieves, page 186 (1968) by C. V. McDaniel and P. K. Maher, the teachings of which are hereby incorporated by reference. In general, "ultrastable" refers to a Y-type zeolite which is highly resistant to degradation of crystallinity by high temperature and steam treatment and is characterized by a $R_2O$ content (wherein R is Na, K or any other alkali metal ion) of less than about 1 weight percent and a unit cell size less than 24.5 Angstroms and a silica to alumina mole ratio in the range of 3.5 to 7 or higher. The ultrastable zeolite is identified both by the smaller unit cell and the low level of alkali metal in the crystal structure. The particle size of the zeolites are usually in the range of 0.1 to 10 microns, more preferably in the range of 0.5 to 3 microns. Preferably, the ultrastable Y-type zeolite component of the catalyst of the present invention will be substantially free of rare earth metals. By "substantially rare earth free" is meant herein that the rare earth metal content of the zeolite will be less than about 1 weight percent, calculated as the elemental metal, based on the zeolite.

THE ALUMINA-CONTAINING MATERIAL

The alumina starting material used for the preparation of the catalyst of the present invention may be gamma, eta, theta alumina, alpha alumina monohydrate, amorphous silica-alumina, alumina hydrogel, etc. As will hereinafter be described, the alumina starting material utilized will depend on the particular type of catalyst end usage. The alumina starting material may comprise a minor amount of silica, such as, for example, from about 1 to about 6 weight percent silica based on the alumina material.

THE ZIRCONIUM COMPOUNDS

Suitable zirconium compounds for use as starting material in the preparation of the present invention include inorganic zirconium salts such as zirconyl nitrate, zirconyl chloride; salts of organic acids, such as zirconium ethanoate, zirconium propanoate; zirconium esters such as n-propyl zirconate; zirconium complexes such as zirconium acetylacetonate, etc.

Any zirconium compound that is convertible to said zirconium oxide (i.e. zirconia) under preparation conditions is suitable as starting material.

THE HYDROGENATION COMPONENT

The hydrogenation component starting material may be any of the known hydrogenation components of Group VIB and Group VIII of the Periodic Table of Elements, generally metal salts or heteropoly acids that are convertible under preparation conditions to an elemental metal, metal oxide or metal sulfide of a Group VIB metal, and an elemental metal, metal oxide and metal sulfide of a Group VIII metal, and mixtures thereof. The Periodic Table referred to herein is in accordance with *Handbook of Chemistry and Physics* by Chemical Rubber Company, Cleveland, Ohio, 45th Edition, 1964. The preferred Group VIB metal component in the final catalyst is selected from the group consisting of molybdenum oxide, molybdenum sulfide, tungsten oxide, tungsten sulfide, and mixtures thereof. The preferred Group VIII component in the final catalyst is selected from the group consisting of nickel oxide, nickel sulfide, cobalt sulfide, cobalt oxide and mixtures thereof.

The hydrogenation component used as a starting material can be composited with the calcined ultrastable Y-alumina-zirconia product according to any method known in the art, such as by impregnation in aqueous or non-aqueous medium, vapor phase deposition, etc.

The calcination which precedes the compositing with the hydrogenation component is suitably conducted at a temperature ranging from about 300° to about 600° C., preferably from about 400° to about 550° C.

Alternatively, the hydrogenation component may be composited with the other components at any suitable stage of the preparation of the catalyst prior to calcination.

EMBODIMENT A PREPARATION

One method of preparing a catalyst of the present invention will, hereinafter, be referred to as "embodiment A" preparation. The resulting catalyst is particularly well suited for hydrocracking of heavy hydrocarbonaceous oils.

Preparation method A comprises the steps of:

(a) mixing an ultrastable Y-type zeolite with alpha alumina monohydrate (i.e. boehmite);

(b) treating the product resulting from step (a) with an aqueous solution comprising a zirconium compound (such as zirconyl nitrate) convertible to a zirconium oxide;

(c) reacting the product resulting from step (b) with a neutralizing agent;

(d) calcining the product resulting from step (c) at a temperature ranging from about 400° to about 550° C.; and (e) impregnating the product resulting from step (d) with a hydrogenation component selected from the group consisting of Group VIB, and Group VIII components and mixtures thereof.

The neutralizing agent, such as a base, is added to step (c) in an amount less than the theoretical amount needed to neutralize the acid liberated by the hydrolysis of the zirconium compound. Suitable bases include ammonia, urea, ammonium carbonate and quaternary ammonium hydroxides. Other bases such as NaOH or KOH could be used, however, ammonia and ammonium hydroxides are preferred to avoid cation contamination.

The catalyst produced by preparation A comprises from about 10 to about 50 weight percent ultrastable zeolite Y; from about 25 to about 75 weight percent alumina; from about 3 to about 10 weight percent zirconia and from about 5 to about 30 weight percent hydrogenation metal components, calculated as the elemental metal oxide based on the total catalyst.

The catalyst prepared in accordance with preparation A may further comprise silica in amounts from about 1 to about 6 weight percent based on the total catalyst. In that case, sufficient amount of silica is used as starting material to give the desired amount of silica in the final catalyst.

EMBODIMENT B PREPARATION

Another method of preparing a catalyst of the present invention is herein designated "preparation B". The resulting catalyst is particularly well suited as hydrodesulfurization catalyst.

Preparation B comprises the steps of:

(a) dispersing an ultrastable Y-type zeolite in an alumina. The alumina starting material may be an alumina hydrogel, gamma alumina, eta alumina, silica-alumina or alumina containing minor amounts of silica, such as from about 1 to about 6 weight percent silica, based on the alumina component. The dispersion results in an "encapsulated" zeolite.

(b) calcining the product resulting from step (a) at a temperature ranging from about 450° to about 600° C.;

(c) treating the product resulting from step (b) with a zirconium compound such as n-propylzirconate, convertible to zirconium oxide;

(d) calcining the product resulting from step (c) at a temperature ranging from about 400° to about 550° C., thereby converting the zirconium compound to zirconium oxide;

(e) impregnating the product resulting from step (d) with a Group VIB component such as molybdenum;

(f) calcining the product resulting from step (e) at a temperature ranging from about 400° to about 600° C.;

(g) impregnating the product resulting from step (f) with at least one Group VIII component, preferably with a mixture of Group VIII metal components such as a nickel component and a cobalt component;

(h) calcining the product resulting from step (g) at a temperature ranging from about 350° to about 500° C.

The resulting catalyst recovered from preparation B comprises from about 5 to about 25 weight percent Group VIB metal component, calculated as the metal oxide based on the total catalyst, from about 2 to about 10 weight percent Group VIII metal, calculated as the metal oxide (CoO, NiO), based on the total catalyst, from about 10 to about 50 weight percent ultrastable Y-type zeolite, from about 25 to about 75 weight percent alumina, from about 2 to about 10 weight percent zirconia.

The catalyst resulting from preparation B may in addition comprise from about 1 to about 6 weight percent silica. In that case, silica is added as a starting material in sufficient amount to be present in the desired amount in the final product.

The catalyst of the present invention may be sulfided prior to use in a conventional manner. The catalyst may be disposed in a fixed bed, moving bed, fluidized bed, ebullating bed, disperse phase, etc.

The catalyst of the present invention may be used in hydrorefining, hydrodesulfurization, hydrocracking, hydrogenation, etc.

The operating conditions to be employed in the practice of the present invention are well known and vary with the particular conversion reaction desired. Table I summarizes typical reaction conditions effective in the present invention.

TABLE I

| Principal Reaction Desired | Temperature, °F. | Pressure, psig | Feed Rate V/V/Hr |
|---|---|---|---|
| Hydrorefining | 500–800 | 50–2000 | 0.1–10 |
| Hydrodesulfurization | 600–850 | 500–3500 | 0.05–5 |
| Hydrocracking | 400–950 | 200–3000 | 0.1–10 |

The feedstocks suitable for conversion in accordance with the invention include any of the well knwon feeds conventionally employed in hydrocarbon hydroprocessing processes. The hydrocarbonaceous oil feed may be derived from any source, such as petroleum, shale, tar sands, coal liquefaction products, including coal liquefaction bottoms and mixtures thereof.

For hydrocracking and hydrodesulfurization with the catalyst of the present invention, oils having an atmospheric pressure boiling point ranging from about 450° to about 1050° F., preferably from about 650° to 1050° F. are preferred, for example, gas oils. For hydrocracking, the nitrogen content of the hydrocarbonaceous feed to the hydrocracking stage preferably is less than about 10 wppm. The low nitrogen content can be obtained by prehydrotreating a hydrocarbonaceous feed having a higher nitrogen content, as is well known in the art, utilizing a conventional suitable hydrotreating catalyst, such as, for example, nickel-molybdenum on alumina.

PREFERRED EMBODIMENTS

The following examples are presented to illustrate the invention.

EXAMPLE 1

A catalyst of the invention was prepared in accordance with method A of the present invention as follows:

One hundred and thirty-nine grams of spray dried alpha alumina monohydrate (NVM=73.6) plus 37 grams of ultrastable Y zeolite were ball milled overnight. The product was treated with 12.5 grams of zirconyl nitrate dissolved in 250 cc of $H_2O$ and mixed thoroughly. Sixteen cc of 6 N $NH_4OH$ + 34 cc of water were then added and mixed in thoroughly. After air drying, the support material was calcined 3 hrs. at 427° C. It was then crushed and screened to give a 14/35 mesh Tyler fraction. The BET surface area and pore volume of the $ZrO_2$—$Al_2O_3$/ ultrastable Y-type zeolite mixture were found to be 301 m²/g and 0.43 cc/g, respectively.

Thirty seven and eight tenths grams of the above material were left exposed to air overnight. The weight, after exposure, was 41 grams. This was impregnated with 9.6 g of phosphomolybdic acid and 7.0 grams of $Ni(NO_3)_2.6H_2O$ from a methanol solution (this should give ca. 15% $MoO_3$ and ca. 3.78% NiO in the catalyst after calcination). The impregnated sample, after drying, was calcined in $N_2$ for 1 hr. at 317° C. and 2 hrs. at 427° C. followed by air calcination for 2 hrs. at 427° C. The final catalyst had the composition shown in Table II. This catalyst is herein designated "Catalyst C".

EXAMPLE 2

Catalyst C was compared with a standard catalyst (Catalyst E). The catalysts were tested in a four reactor screening unit having a common sandbath. In each reactor, 10 cc of catalyst D were added to the top of the reactor. In one reactor, 100 cc of catalyst E were added to the bottom, and in the other reactor catalyst C, which is a catalyst in accordance with the present invention, was used. The test of catalyst E was designated "run 160" while the test of catalyst C was designated "run 162". The catalysts were charged as 14–35 mesh Tyler and the test was carried out downflow. The composition of the catalysts is shown in Table II.

TABLE II

| Catalyst C | | Catalyst D | | Catalyst E | |
|---|---|---|---|---|---|
| Component | wt% | Component | wt% | Component | wt% |
| $Al_2O_3$ | 56.74 | $Al_2O_3$ | 68.96 | $Al_2O_3$ | 50 |
| USY | 20.58 | $SiO_2$ | 6.00 | Y zeolite | 20 |
| $ZrO_2$ | 3.55 | Ni as NiO | 3.12* | NiO | 6 |
| Ni as NiO | 3.83 | Mo as $MoO_3$ | 15.92* | $MoO_3$ | 18 |
| Mo as $MoO_3$ | 14.98 | P as $P_2O_5$ | 6.00 | $P_2O_5$ | 6 |
| P as $P_2O_5$ | 0.32 | | | | |

*by analysis

Sulfiding the catalyst was started at 200° F. with 10% $H_2S$ in $H_2$ at atmospheric pressure. After 1 hour at these conditions, temperature was increased to 450° F. for 1 hour and finally to 700° F., where it was held for ca. 16 hours. The sulfiding gas was cut out and temperature was raised to 720° F. and $H_2$ was cut in. The pressure was increased to 1300 psig and light Arabian vacuum gas oil was cut in at 1 V/Hr/V (10 cc/hr). The gas rate was adjusted to 6000 SCF/B (10.7 l/hr). The feedstock used was a virgin gas oil having an atmospheric boiling point range from about 650° to 1050° F.

Operation at these conditions was maintained until steady state data were obtained, at which time the temperature was increased to 744° F. In addition, data were obtained at 769° F. with a check of activity level at 720° F. Data from the test are shown in Table III.

TABLE III

| | Catalyst E | | | Catalyst C | | | | Feed |
|---|---|---|---|---|---|---|---|---|
| Temp., °F. | 720 | 744 | 769 | 720 | 720 | 744 | 769 | 720 | |
| °API, at 60° F. | 32.3 | 41.7 | 46.7 | 28.0 | 36.7 | 41.8 | 51.4 | 28.1 | 20.9° API, at 60° F. |
| S, ppm | 35 | 17 | 21 | 159 | 22 | 12 | 11 | 102 | 2.35% |
| N, ppm | 6 | 2 | — | — | 6 | 1 | — | — | 892 ppm |
| % 650° F.⁻ | 31.6 | 64.2 | 92.1 | — | 41.8 | 62.6 | 96.4 | — | 1.4% 650° F.⁻ |
| MD/NAP[1] | 1.13 | 0.70 | 0.11 | — | 1.08 | 0.86 | 0.07 | — | |

[1] 430–650/C₅–430° F.
MD/NAP = middle distillate to naphtha

The selectivity to conversion relationship is shown in the figure. Catalyst C of the present invention showed better selectivity to mid-distillate than catalyst E when compared at the same 650° F.⁻ conversion level. In addition, catalyst C demonstrated high conversion activity as shown by the 650° F.+ in the product and product gravity.

EXAMPLE 3

A catalyst was prepared in accordance with preparation B of the present invention as follows.

Forty-eight grams of a silica-alumina (2% silica) support containing ca. 25 wt. % USY zeolite in the form of small beads were treated with 23 grams of 95% n-propyl zirconate (ca. 0.05 mols) diluted with isopropyl alcohol to give 75 cc of solution. The treatment was done at 65°–70° C. for 2 hours. The material was then transferred to an evaporating dish and allowed to hydrolyze in air overnight. The beads were then calcined for 3 hrs. at 427° C. bringing the temperature up slowly. This treatment should give approximately 11 wt. % $ZrO_2$ in the support.

The zirconia-treated beads, after calcination, were found to have a BET surface area of 368 m$^2$/g and a pore volume of 0.78 cc/g. This material was then impregnated with phosphomolybdic acid and, after dyring, was calcined 3 hours at 538° C. The molybdena-impregnated support was then impregnated with a mixture of cobalt and nickel nitrates, dried and calcined 3 hours at 800° F. (427° C.).

The BET surface area of the finished catalyst was 272 m$^2$/g and the pore volume 0.57 cc/g. Wt. % Co as CoO was 2.16%; wt. % Ni ad NiO was 2.37%, and the wt. % Mo as $MoO_3$ was 16.95%. The wt. % ultrastable zeolite Y was 17.47; the wt. % alumina was 52.40; the wt. % zirconia was 8.64. This catalyst is herein designated "catalyst F" and is a catalyst of the invention.

EXAMPLE 4

Four catalysts were charged to a pilot plant, one was a standard hydrodesulfurization catalyst herein designated "catalyst G". The composition of catalyst G is shown in Table IV.

TABLE IV

| Component | Catalyst G Wt. % |
|---|---|
| CoO | 4.31 |
| $MoO_3$ | 19.2 |
| $Al_2O_3$ | 76.5 |

The evaluation of catalyst G was made in run 164. The evaluation of catalyst F was made in run 166. Twenty cubic centimeters of each catalyst were charged to an upflow reactor. The reactors were charged at 200° F. and 10% $H_2S$ in $H_2$ was cut in at atmospheric pressure and passed over the catalyst for 1 hour. The common sand bath was heated to 450° F. and sulfiding continued for another hour. Subsequently, the reactors were heated to 700° F. and sulfiding continued overnight for ca. 16 hours.

The sulfiding gas was cut out and the temperature reduced to 575° F. $H_2$ was introduced at 3.3 l/hr (1500 SCF/B) and pressure raised to 1500 psig.

Next, a virgin gas oil was cut in at 20 cc/hr (1 V/Hr/V). The gas oil had an atmospheric pressure boiling point ranging from about 650° to 1050° F. and a sulfur content of about 2.4 wt. %. The temperature was raised to 685° F. over a 162 hour period. The results of the tests are shown in Table V.

TABLE V

| Catalyst | Relative Hydrodesulfurization Activity |
|---|---|
| G | 100 |
| F | 126 |

As can be seen from Table V, the hydrodesulfurization activity of catalyst F, which is a catalyst in accordance with the present invention, was superior to the activity of catalyst G, which is a conventional hydrodesulfurization catalyst.

What is claimed is:
1. A catalyst prepared by the steps which comprise:
   (a) mixing an ultrastable Y-type crystalline aluminosilicate zeolite and alumina;
   (b) treating the product resulting from step (a) with a zirconium compound convertible to zirconium oxide by calcination;
   (c) calcining the product resulting from step (b), thereby converting the zirconium compound to zirconium oxide;
   (d) compositing the product resulting from step (c) with a hydrogenation component comprising at least one Group VIB metal component and at least one Group VIII metal component, and
   (e) recovering a catalyst consisting essentially of said ultrastable Y-type zeolite, alumina, zirconium oxide and a hydrogenation component selected from the group consisting of an elemental metal, metal oxide and metal sulfide, of at least one Group VIB metal and an elemental metal, metal oxide and metal sulfide of at least one Group VIII metal and mixtures thereof.
2. The catalyst of claim 1 wherein said alumina additionally comprises from about 1 to about 6 weight percent silica, based on the alumina, and wherein the recovered catalyst also comprises said silica.
3. The catalyst of claim 1 wherein the calcination of step (c) is conducted at a temperature ranging from about 300° to about 600° C.
4. The catalyst of claim 1 wherein prior to step (b) the product of step (a) is calcined and wherein the product resulting from step (c) is composited with said hydrogenation component by first impregnating the step (c) product with at least one Group VIB metal component, followed by calcination and thereafter impregnating the calcined Group VIB impregnated product with at least one Group VIII metal component, followed by calcination of the Group VIII impregnated product.
5. The catalyst of claim 4, wherein said product of step (a) is calcined prior to step (b) at a temperature ranging from about 450° C. to about 600° C., and wherein said Group VIB metal impregnated product is calcined at a temperature ranging from about 400° to about 550° C. and said Group VIII impregnated product is calcined at a temperature ranging from about 350° C. to about 500° C.
6. The catalyst of claim 1 wherein said Group VIB metal component is a molybdenum component or a tungsten component and wherein said Group VIII metal component is a mixture of a nickel component and a cobalt component.
7. The catalyst of claim 4 wherein said recovered catalyst comprises said hydrogenation component compositied with an ultrastable Y-type zeolite encapsulated in alumina, said alumina being coated with said zirconium oxide.

8. The catalyst of claim 7 wherein the recovered catalyst comprises from about 5 to about 35 weight percent of said hydrogenation component, calculated as the metal oxide, based on the total catalyst, from about 10 to about 50 weight percent of said ultrastable Y-type zeolite, from about 25 to about 75 weight percent of said alumina, and from about 2 to about 10 weight percent of said zirconium oxide.

9. The catalyst of claim 1 wherein said alumina material comprises alpha alumina monohydrate.

10. The catalyst of claim 9 wherein said zirconium compound of step (b) is a zirconium salt.

11. The catalyst of claim 9 wherein the recovered catalyst comprises said hydrogenation component composited with a zirconia-modified alumina and an ultrastable Y-type zeolite.

12. The catalyst of claim 11 wherein said alpha alumina monohydrate additionally comprises from about 1 to about 6 weight percent silica, based on said alpha alumina monohydrate and wherein said recovered catalyst also comprises silica.

13. The catalyst of claim 11 wherein said recovered catalyst comprises from about 5 to about 30 weight percent hydrogenation component, calculated as the metal oxide, based on the total catalyst, composited with from about 25 to about 75 weight percent of said alumina, from about 2 to about 10 weight percent zirconium oxide, and from about 10 to about 50 weight percent ultrastable Y-type zeolite.

14. The catalyst of claim 1 wherein said ultrastable Y-type zeolite is substantially free of rare earth metals.

* * * * *